United States Patent [19]

Hager

[11] 4,231,326
[45] Nov. 4, 1980

[54] DOG FOOD CONTAINER AND FEEDER

[76] Inventor: David P. Hager, Deer River, Minn. 56636

[21] Appl. No.: 963,386

[22] Filed: Nov. 24, 1978

[51] Int. Cl.³ .............................................. A01K 5/00
[52] U.S. Cl. ................................. 119/52 R; 229/17 R
[58] Field of Search ................... 119/52 R, 51 R, 23; 229/7 R, 17 R, 17 B, 41 B

[56] References Cited

U.S. PATENT DOCUMENTS

| | | | |
|---|---|---|---|
| 1,189,779 | 7/1916 | Becker | 119/52 R |
| 1,378,533 | 5/1921 | FitzGerald | 119/52 R |
| 2,775,226 | 12/1956 | Early | 119/52 R |
| 2,891,711 | 6/1959 | Early | 119/51 R |
| 3,602,196 | 8/1971 | Tucci | 229/17 R |

Primary Examiner—Jay N. Eskovitz
Attorney, Agent, or Firm—Clayton R. Johnson

[57] ABSTRACT

A dog food container and feeder that is formed from a single precut-perforated cardboard blank which has panels foldable to provide a front, rear and end walls, a top closure, a bottom closure and an inclined panel to direct the food toward the container front wall. The container front wall and a front reinforcing panel have fold lines and perforations defining a tray formable portion that can be separated from the remainder of the front wall by the purchaser of a filled container to provide a discharge opening and folded into a rectangular tray joined to the bottom closure at a fold line and have the tray and front walls retained in vertical conditions by tabs joined to the tray front wall and the reinforcing panel and extended through slots in the tray side walls. One of the top closure panels is foldable to a horizontal condition to be in overhanging relationship to the tray and has tabs to be folded and extended through slots in the front wall to retain the top closure panel in a horizontal condition.

18 Claims, 9 Drawing Figures

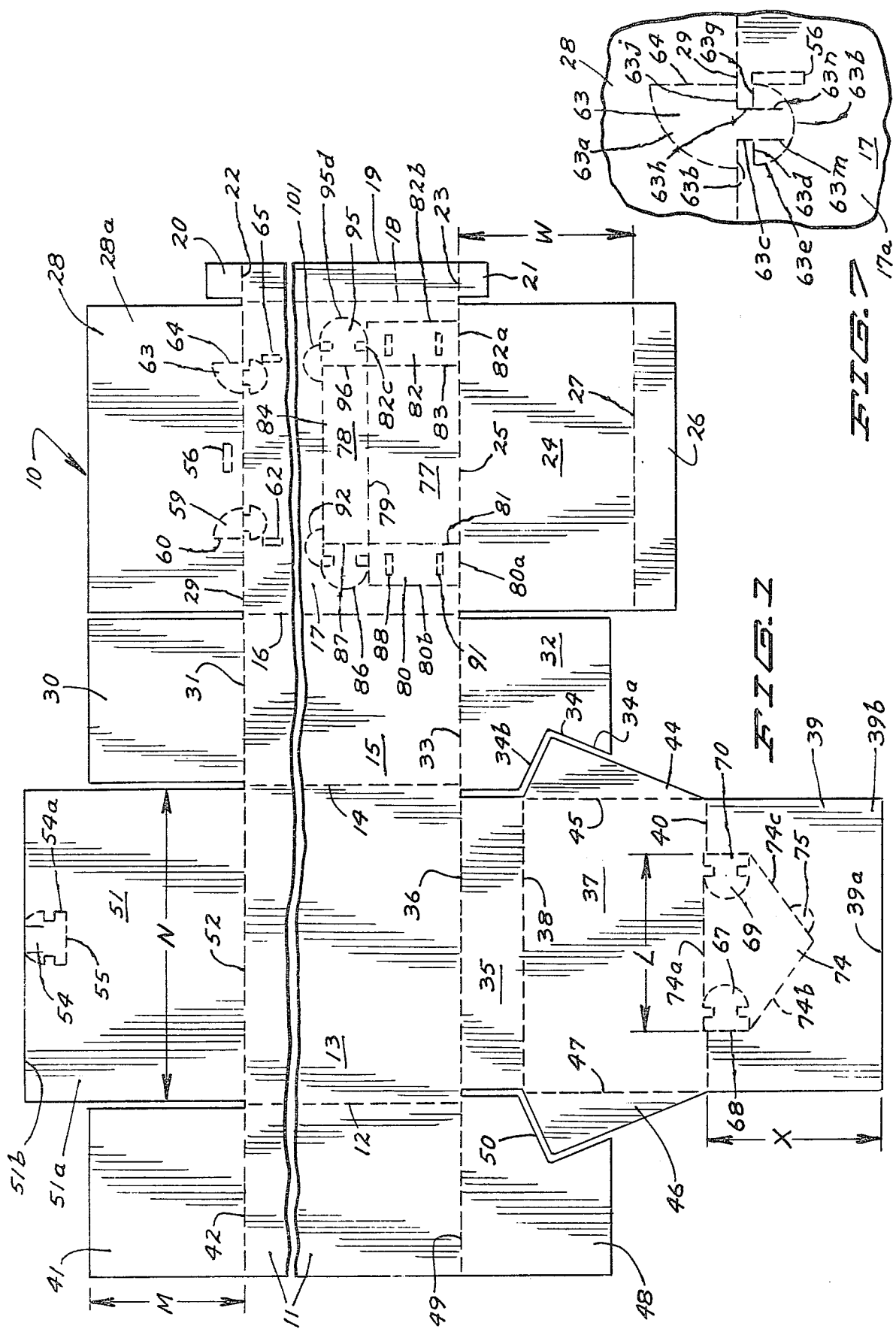

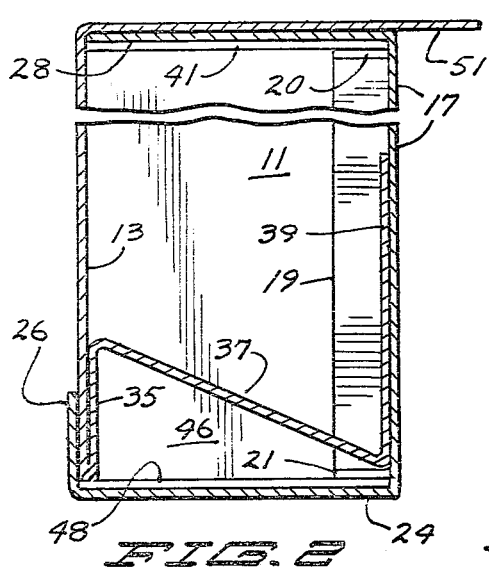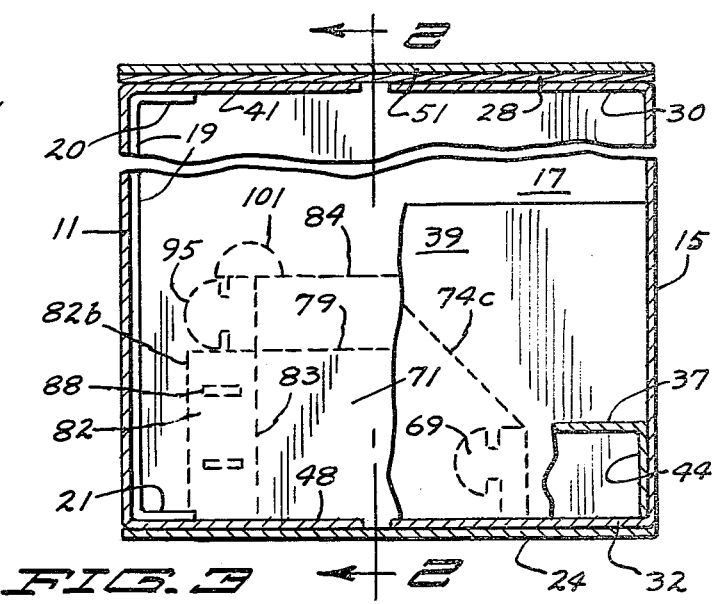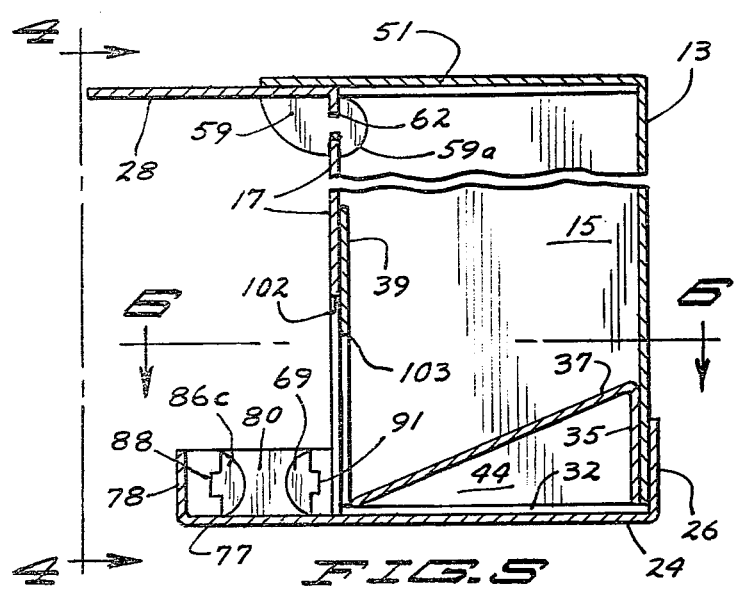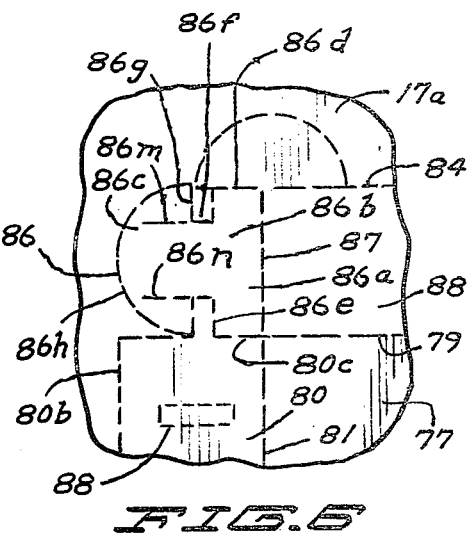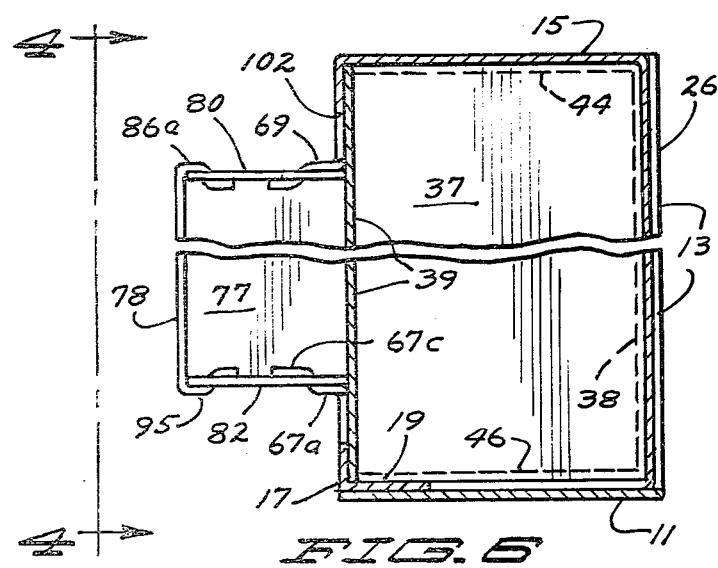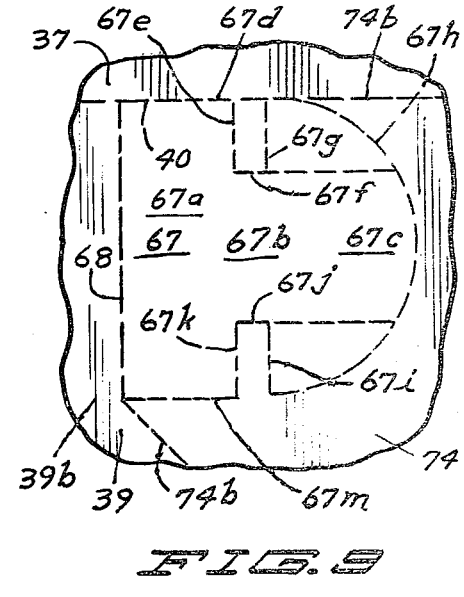

DOG FOOD CONTAINER AND FEEDER

BACKGROUND OF THE INVENTION

A shipping container for animal food that has a portion thereof formable to provide a feeding trough.

In the prior art it is old to provide a shipping container or carton having a portion thereof that may be formed to provide a trough, for example see U.S. Pat. Nos. 2,556,661 and 3,478,948. U.S. Pat. No. 2,556,661 also discloses providing an insert made of a piece of cardboard separate from the container that is inclined to direct feed in the container toward the opening in the side wall that opens to the trough. U.S. Pat. No. 3,089,462 discloses a package and feeder that includes a container made of two separate pieces, one being an open bottom hopper and the other a base member that is foldable to provide a rectangular tray on each side of the hopper.

In order to provide an improved feed shipping container that is easily formable to provide a hopper and a tray to receive feed from the hopper, this invention has been made.

SUMMARY OF THE INVENTION

A dog food container and feeder made from a single piece of material that includes side and end walls, a top closure, a bottom closure and a wall inclined downwardly toward one of the side walls, the one side wall having a precreased and perforated portion that is separable from the remainder of the one side wall along perforated lines and has fold lines to provide wall portion foldable to form a rectangular tray that is joined to the bottom closure.

One of the objects of this invention is to provide an animal food shipping container having a new and novel prescored, perforated sidewall portion that is foldable to provide a rectangular tray. A further object of this invention is to provide a shipping container of a new and novel construction to provide a tray that is formable from a portion of one side wall thereof, and has an inclined wall that is formed from the same prescored blank that container side and end walls are formed from.

BRIEF DESCRIPTION OF THE DRAWINGS

FIG. 1 is a prescored, or creased, and perforated blank of the container and feeder of this invention with an intermediate portion broken away;

FIG. 2 is a vertical cross-sectional view of the container of this invention as formed for shipping, said view being generally taken along the line and in the direction of the arrows 2—2 of FIG. 3 with a vertical intermediate portion broken away;

FIG. 3 is a vertical cross-sectional view generally taken along the line and in the direction of the arrows 3—3 of FIG. 2 with a vertical intermediate portion, a portion of the inclined panel and a portion of the front vertical reinforcing panel broken away;

FIG. 5 is a vertical cross-sectional view generally taken along the line and in the direction of the arrows 5—5 of FIG. 4;

FIG. 6 is a horizontal cross-sectional view generally taken along the line and in the direction of the arrows 6—6 of FIG. 4;

FIG. 7 is a view of an enlarged fragmentary portion of the blank of FIG. 1 to more clearly show the prescoring and perforations that delineates one of the tabs and tab slots for supporting one of the top closure panels in overhanging relationship to the tray;

FIG. 8 is a view of an enlarged fragmentary portion of the blank of FIG. 1 to show the prescoring and perforations that delineates adjacent end portions of one of the tray side and end walls and the tab for connecting said end portions together; and FIG. 9 is a view of an enlarged fragmentary portion of the blank of FIG. 1 to show the prescoring and perforations that delineates one of the tabs on the front vertical reinforcing panel for connecting one of the tray side walls to said panel.

Figure 4:
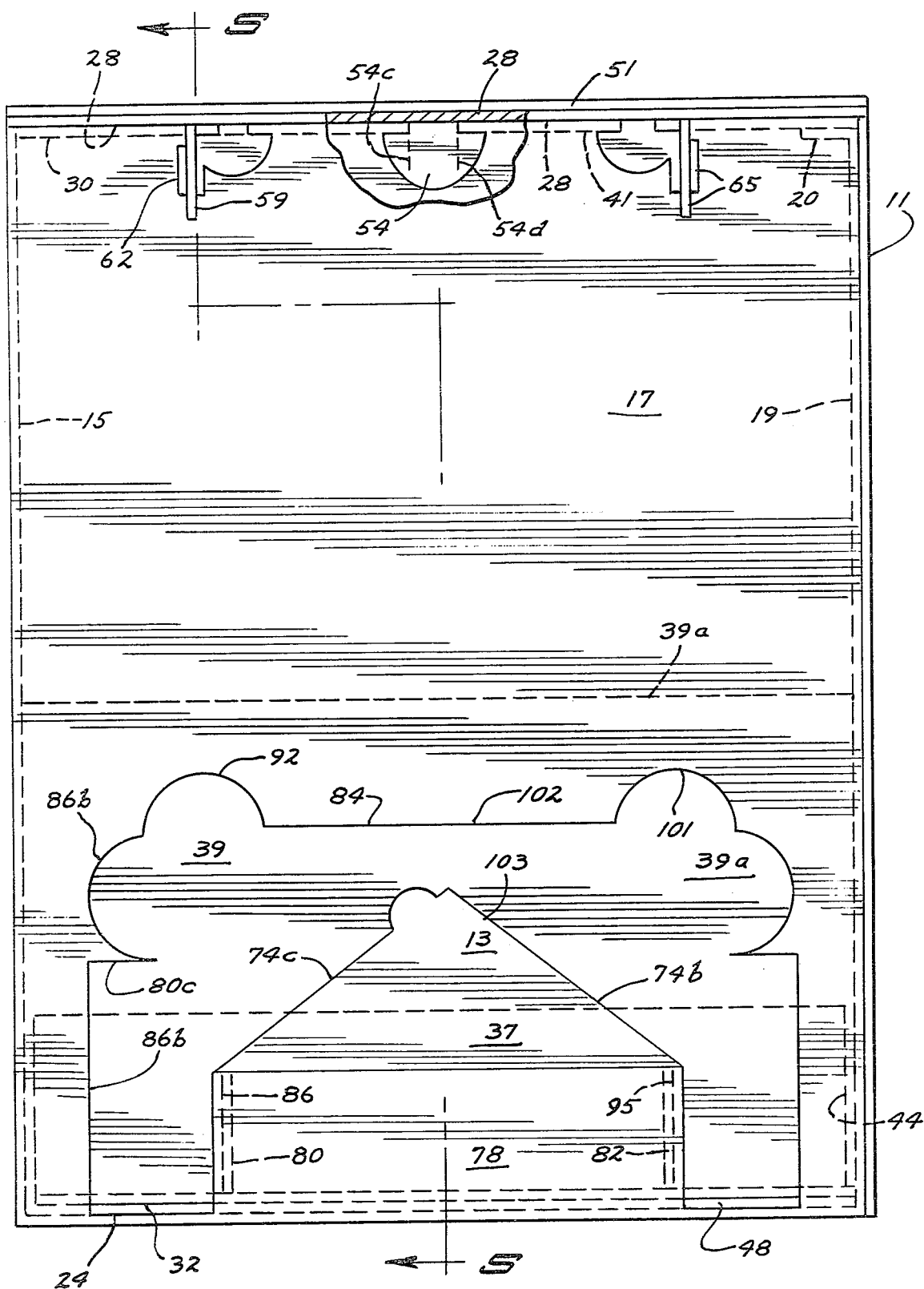
FIG. 4 is a front view of the container and feeder set up in a condition for feeding an animal, said view being generally taken along the line and in the directions of the arrows 4—4 of FIGS. 5 and 6.

The container-feeder of this invention is formed from a single precut cardboard blank, generally designated 10, with prescored lines (crease lines) and perforated lines as shown in FIG. 1. The blank 10 includes a sidewall 11 joined at fold line 12 to rear wall 13, the rear wall being joined at fold line 14 to side wall 15. Side wall 15 is joined a fold line 16 to front wall 17 which in turn is joined at fold line 18 to the vertical seal flap 19. An upper tab 20 is joined at fold line 22 to the seal flap while a lower tab 21 is joined to the seal flap at fold line 23.

Bottom wall 24 is joined to the front wall at fold line 25 while a horizontal seal flap 26 is joined at fold line 27 to the bottom wall. An inside top wall flap 28 is joined at fold line 29 to the front wall 17. Joined to side wall 15 at fold line 31 is a top side flap 30 while a bottom side flap 32 is joined at fold line 33 to the same side wall. The bottom side flap 32 is provided with a quadrilateral shaped cut out 34 that in part is defined by edges 34a, 34b of panel 34 which intersect at right angles.

A vertical support panel 35 is joined to the rear wall 13 at fold line 36 while an inclined panel 37 is joined to the support panel at fold line 40. A vertical reinforcing panel 39 is joined to the inclined panel at fold line 40. Side reinforcing panels 44 and 46 are respectively joined at fold lines 45 and 47 to the inclined panel, panels 44, 46 being of a triangular shape.

A bottom side flap 48 which has a cut out 50 of the same size and shape as cut out 34 is joined to the side wall 11 at fold line 49 while top side flap 41 is joined to the side wall 11 at fold line 42. The top cover flap 51 is joined to the rear wall at fold line 52, the top cover being provided with a tab 54 that is joined to the main body portion 51a of the cover at a linear fold line 55. The remainder of the tab is defined by a perforated line 54a that initially extends from opposite ends of fold line 55 at right angles thereto toward cover terminal edge 51b, thence at right angles toward one another, then again at right angles to extend toward edge 51b, thence at right angles away from one another, and thence therebetween is arcuately curved as shown in FIG. 1. As viewed in FIG. 1, the upper portion of the tab is generally semi-circular and has its lower portion joined to an intermediate rectangular portion which in turn is joined to a lower rectangular portion that is of a greater length. The intermediate portion of the tab comprises a narrow neck portion. As a result, tab 54 may be easily separated from main body portion 51a and folded about line 55 for reasons to be set forth.

The inside top cover flap 28 and front wall 17 are provided with spaced tabs 59 and 63 that are respectively joined to the top cover flap main body portion 28a at parallel fold lines 60, 64 with the quarter circular portions of the tabs being between the fold lines 60, 64. Since the tabs 59 and 63 are of the same size and shape except their quarter circular portions are oppositely faced, primarily only tab 63 will be further described. Referring to FIG. 7, tab 63 is in part defined by a quarter circular perforated line 63a that extends from the upper end of fold line 64 to fold line 29, thence along a perforated line 63b toward fold line 64 that is coextensive with part of fold line 29, then downwardly along a perforated line 63c, thence horizontally along a perforated line 63d in a horizontal direction away from line 64, next along a semicircular perforated line 63f to a horizontal perforated line 63g that is parallel to and below fold line 29, upwardly along vertical perforated line 63h to fold line 29 and thence along a perforated line 63j to the lower end of fold line 64, line 63j being coextensive with part of line 29. Thus the tab quarter circular part is integrally joined to the adjacent upper edge of the rectangular part (narrow neck portion), said upper edge being of a substantially smaller dimension than the radius of the quarter circular part and centered relative the quarter circular part lower edge. The lower edge of the rectangular part is centered relative the base diametric edge of the semicircular part and of a substantially smaller dimension. The quarter circular part, rectangular part and semicircular part of tab 63 are severable from the main body portions 28a, 17a of the walls 28, 17 along perforated lines 63a through 63j.

Adjacent and on opposite sides of the semicircular parts of tabs 59, 63, the front wall 17 has a rectangular push out portions that are defined by perforated lines 62, 65 to be separated from the remainder of the front wall. The height of the push out portions 63, 65 is greater than the radius of the semicircular tab portions but less than the diameter thereof. Intermediate the quarter circular portions of tabs 59,63 there is provided a rectangular push out portion 54, defined by perforated lines, to be separated from the remainder of the inside top wall flaps 28. The length of the push out 56 is greater than the intermediate rectangular portion of tab 54 but less than diameter of the generally semicircular part thereof.

The vertical reinforcing panel 39 has spaced, oppositely faced tabs 67, 69 that are separably along perforated lines from the main body portion 39b of said panel, except along fold lines 68 and 70 respectively which are parallel to one another. Since other than being oppositely faced, the tabs 67, 69 are of the same size and shape, primarily only tab 67 will be described. Referring to FIG. 9, tab 67 includes a large rectangular portion 67a having one edge joined to main body portion 39b at fold line 68, a perforated line second edge 67d that is coextensive with part of fold line 40, a perforated line third edge 67m parallel to edge 67d and a fourth edge that is in part defined by perforated line edges 67e, 67k that extend inwardly from edges 67d, 67m, respectively, toward one another, but have their adjacent ends substantially spaced. The smaller rectangular part (narrow neck portion) 67b of tab 67 has opposite edges 67f, 67j, a nonperforated third edge (extends between lines 67e, 67k) centered with reference to and integrally joined to the larger rectangular and a fourth edge. The semicircular part 67c of tab 67 is defined by perforated lines 67h (semicircular), 67g, 67i and a nonperforated diametric edge portion between lines 67g, 67i that is integrally joined to the fourth edge of part 67b.

The vertical reinforcing panel 39 also has a tear out portion 74 that is defined by a perforated line 74a that is coextensive with part of fold line 40 from the juncture of lines 67h, 67g to the corresponding juncture of tab 69, perforated lines 67h, 67i, 67j, 67k, 67m of tab 67 and corresponding lines of tab 69, a perforated line 74b that at one end intersects the junction of lines 67m, 68 and a perforated line 74c that at one end intersects line 74b and at the other end the juncture of line 70 and the line of tab 69 that corresponds to line 67m. A semicircular finger notch tear out 75 has its diametric edge defined by part of line 74c, and the rest thereof is defined by a semicircular perforated line.

The lower part of the front wall 17 includes a rectangular tray bottom panel 77 that is bounded by fold lines 25, 81, 79, 83; panel 77 being joined at fold line 79 to the tray front panel 78 which is thereabove. A rectangular tray side panel (side wall) 80 is joined at fold line 81 to the bottom panel 77 to be at one side thereof while a rectangular tray side panel (tray side wall) 82 is joined to the opposite of panel 77 at fold line 83. Each of the panels 80, 82 has upper and lower rectangular perforated lines 88, 91, respectively, to provide rectangular push outs which when pushed out of the panels 80, 82 provide rectangular slots. One end of panel 80 is defined by a perforated line 80a that is coextensive with, but of a shorter length than fold line 25, a second edge defined by a perforated line 80b that is opposite the third edge which is defined by fold line 81 and a fourth edge 80c that extends lineraly with reference to and away from fold line 79 (see FIG. 8). Panel 82 is likewise defined by fold line 83 and lines corresponding to perforated lines 80a, 80b, 80c.

The tray front panel 78 has one edge defined by fold line 79, an opposite edge defined by perforated line 84, and end edges defined by perforated lines 87, 96, respectively. Further, the front wall 17 has tabs 86 and 95 which are joined to the tray front panel at fold lines 87, 96, respectively.

Since the tabs 86, 94 are of the same size and shape, primarily only tab 86 will be described. Tab 86 includes a larger rectangular part 86a that has one edge defined by fold line 87, opposite edges defined by perforated lines 86d, one of which is shorter than but coextensive with line 80c, and a fourth edge that in part is defined by spaced lines 86e; a smaller rectangular part (narrow neck portion) 86b having a nonperforated one edge integrally joined to the fourth edge of of part 86a and extending between perforated lines 86e, opposite edges defined by perforated lines 86f and a fourth edge; and a semicircular part 86c having a diametric edge that in part is integrally joined to the fourth edge of part 86b and in part by perforated lines 86g that extend outwardly from the last mentioned fourth edge and a semicircular perforated line 86h. The front wall 17 also has spaced portions finger notch portions that include semicircular parts defined in part by a semicircular perforated line 92 and 101, respectively, and in part by part of line 84; and line 86d for notch portion 92 and corresponding line for portion 101; and rectangular parts that for notch portion 92 are in part defined by lines 86e, 86f, 86g and corresponding line for notch portion 101.

Referring to FIGS. 2 and 3 the blank 10 is folded to have bottom side flaps 32, 48 extend toward one another in horizontal overlaying relationship to the bottom wall 24, the front wall 17 and rear wall 13 parallel to one another, and side walls 11 and 15 parallel to one another with the vertical seal flap 19 inside of wall 11. Flap 19 is adhered to wall 11. Further horizontal seal flap 26 is folded to extend along the lower exterior surface of the rear wall and is adhered thereto.

The vertical support wall 35 is folded to extend vertical upwardly from the lower edge of the rear wall while the incined panel 37 extends downwardly from the top edge of the support wall 35 to adjacent the front wall to be above the bottom side flaps 32, 48. The vertical reinforcing panel 39 extends upwardly from the lower edge of panel 37 and along the inner surface of the front wall to terminate at line 39a (see FIG. 4). Side reinforcing panels 44, 46 extend downwardly along the inner surfaces of walls 15, 11 respectively, to have their lower horizontal edges abut against the inner surfaces of the respective one of the bottom side flaps 32 and 48. At this time tab 21 extends beneath the adjacent part of the lower edge of panel 46 and abuts against the inner surface of flap 48 and may be adhered to flap 48.

Now the set up container is filled with feed (dog food), the top side flaps 30, 41 folded inwardly, the dimension M of each of flaps 30, 41 advantageously being less than one half the dimension N of walls 13, 17; the inside top wall 28 folded to overlay flaps 30, 41; and the top cover flap 51 folded to overlay interior top wall 28. As may be noted in FIG. 2, the width of flap 51 is substantially greater than that of flap 28 whereby it extends outwardly of the front side wall 17. Top flaps 28, 51 are suitably adhered for shipping purposes but permit separation for purposes indicated hereinafter (for example a removable sealing strip, not shown, with or without a rip cord, to adhere the side edges of wall 51 to side walls 41, 30 and the undersurface of the front part of wall 51 to the front wall).

When the customer is ready to use the container as a feeder, the top cover flap 51 is separated from the top interior wall 28 and folded upwardly about fold line 52. Now flap 28 is folded about fold line 29 to extend vertically upwardly from front wall 17, tabs 59, 63 are separated from the main body portions 17a, 28a along perforated lines (lines 63a through 63j for tab 63) and folded about fold lines 60, 64 to extend about 90° relative main body portion 28a. Further, the ears of the semicircular parts of the tabs are folded approximately 180° about their fold lines (63m, 63n for tab 63) to at least partially overlap and after the push outs are separated from the side wall along perforated lines 62, 65 to provide rectangular slots, the top flap 28 folded to extend horizontally outwardly of the front wall, and the folded ear portions are pushed through the slots and the ear portions allowed to unfold so that semicircular parts of the tabs are located in the container such as indicated by semicircular part 59p of tab 59 in FIG. 5. Since the height of these slots is less than the corresponding dimension of the radius of the quarter circular parts of the tabs and the diameter of the semicircular parts of the tabs but greater than the rectangular parts thereof, the tabs retain the flap 28 in a generally horizontal condition.

Further, the push out defined by perforated lines 56 is pushed out, the tab 54 is separated from the main body portion 51a along perforated lines 54a, and separated tab is folded approximately 90° about fold line 55 and the ears of the semicircular part are reversely folded about fold line 54c, 54d to at least partially overlap. Now the flap 51 is folded to overlap the adjacent part of flap 28; and this folded semicirculr part is inserted through the slot defined by perforated lines 56 and the ears thereof allowed to unfold to extend beneath the then undersurface of top flap 28 to hold the cover flap 51 in a closed, generally horizontal position such as shown in FIG. 5.

The finger notch portions of the front wall that are defined in part by perforated lines 92, 101 are separated from the front wall to leave finger openings to facilitate separating tabs 86, 94 and tray walls 77, 78, 80 and 82 along perforated lines 80b, 80c, 82c, 86d, 80a, 82a, 95d and 84 from the main body protion 17a of the front wall. The separated tabs 86, 95 and tray walls are folded about fold line 25 to a generally horizontal position, and the rectangular push outs defined by perforated lines 88, 91 are separated from the remainder of the tray side walls to leave rectangular slots.

The vertical reinforcing panel finger notch 75 is separated along its perforated lines from the remainder of panel 39 to facilitate separating the tear out portion 74 from said panel. Portion 74 is separated from the main body portion 39a along perforated lines 67h through 6m of tab 67, the corresponding perforated lines of tab 69 and perforated lines 74a, 74b, 74c and thrown away and the tab 67 is separated along perforated lines 67d–67g (and tab 69 along corresponding lines) from panels 37, 39 The tabs are folded about fold lines 68, 70 to extend outwardly through the opening 102 of the front wall which resulted from the tray walls and tabs 86, 95 being separated from wall portion 17a.

The tray side and front walls are folded upwardly about fold lines 81, 83, 79 to extend vertically and the ear portions of the semicircular part 86c of tab 86 (and corresponding parts of tab 95) are reversely bent about fold lines 86m, 86n and extended through the slots defined by lines 88. The ear portions are now unfolded to be located in the tray. Similarly the ear portions of the semicircular parts of tabs 67, 69 are folded and extended through the slots defined by lines 91 whereby the tray front and side walls are retained in a generally vertical condition; the relationship of the smaller rectangular portions, the longer rectangular portions and the semicircular portions of tabs 67, 69, 86, 95 to their slots corresponding to that of the rectangular part, the quarter circular part and the semicircular part of tabs 59, 63 to their slots.

Walls 11, 13, 15, 17, 24 provide a bin for containing feed and dispensing feed into the tray.

Now the feed can flow through the opening 103 resulting from separating the tabs 68, 69 and tear out 74 from the panel 39, and through opening 102 into the tray. The inclined panel 37 aids in feed flowing through said openings, particularly when the container is in a near empty condition. The cardboard can be wax coated to make it waterproof, while the flap 28 overhangs the tray to prevent rain falling into the tray.

Even though the description has been made with reference to the container being vertical when the tray is being formed, it is to be understood that advantageously the container may be horizontal (rear wall 13 on the supporting surface) to keep feed from flowing through openings 102, 103 until after the tray is formed.

The width W of bottom wall 24 is less than the corresponding dimension of inclined wall 37, substantially greater than the corresponding dimension of panel 35, and may be about equal to the dimension X of panel 39. The dimension X of panel 39 is substantially greater than the sum of the corresponding dimensions of tray walls 77, 78 and finger notch portion 92, while the maximum corresponding dimension of the opening 103 is less than the sum of the corresponding dimensions of tray walls 77, 78 as seen in FIG. 1.

Additionally, the maximum length dimension L of opening 103 (after tabs 67, 69 and portion 74 are separated) is about the same as the corresponding dimension of the tray bottom wall and substantially less than the corresponding dimension of opening 102 (see FIGS. 1 and 4). As a result panel portion 39a blocks a part of opening 102 whereby feed can only flow out of the container into the tray when set up for feeding an animal.

Since the lengths of the larger rectangular parts of tabs 67, 69, 86, 95 are substantially the same as the height of the tray front and side walls and the larger rectangular parts abut against the exterior surfaces of the tray side walls, feed can't leak out between the adjacent vertical edges of the tray front and side walls, and the vertical edges of the tray side walls and the vertical reinforcing panel 39.

If desired a flexible polyethylene plastic bag-type liner (not shown) may be placed in the container before filling, and in such an event, the customer would sever the liner to provide an opening therein substantially coextensive with opening 103 after the tray is formed and tear out portion 74 has been removed.

What is claimed is:

1. A shipping container feeder for containing feed, comprising a front wall, a rear wall, a bottom closure flap, and side walls joined to one another to form a generally rectangular box shaped bin having an interior and a generally rectangular tray that includes a rectangular bottom wall having one edge integrally joined to the bottom closure flap to extend away from the front wall, a front edge and opposite side edges, a tray vertical front wall joined to the front edge, and opposite tray vertical side walls joined to the side edges, tab means for joining the tray front wall to the tray side walls, a vertical reinforcing panel in the bin interior abutting against the bin front wall and tab means for joining the reinforcing panel to the tray side walls, the bin front wall and panel having openings therethrough to permit flow of feed from the bin interior to the tray.

2. The apparatus of claim 1 wherein the tray front wall has opposite side edges and the tray side walls have front and rear portions, the front and rear portions having tab receiving slots, the first mentioned tab means comprising tabs integrally joined to the tray front wall side edges and having narrowed neck portions extending through the tray side wall front portion slots, and that the second mentioned tab means comprises tabs integrally joined to the vertical reinforcing panel and having narrowed neck portions extended through the tray side wall rear portion slots.

3. The apparatus of claim 1 wherein the front wall has a top edge and there is provided a generally horizontal flap in overhanging relationship to the tray, said horizontal flap having one edge joined to the front wall top edge, and means connected to the horizontal flap and front wall for retaining the last mentioned flap in a generally horizontal condition.

4. The apparatus of claim 3 wherein the bin has a top closure flap joined to the bin rear wall, said top closure flap having a front portion in overlapping relationship to the horizontal flap and that there is provided means for connecting the top closure flap to the horizontal flap.

5. The apparatus of claim 1 wherein the reinforcing panel has a lower edge, and there is provided an inclined panel in the bin interior for directing feed toward said openings, said inclined panel having a lower edge joined to the reinforcing panel lower edge.

6. The apparatus of claim 5 wherein the inclined panel has an upper rear edge adjacent the rear wall and side edges adjacent the bin side walls, and there is provided generally triangular reinforcing panels adjacent the bin side walls that have upper edges joined to the inclined panel side edges and a rear vertical reinforcing panel having a top edge joined to inclined panel rear edge and a lower edge joined to the bin rear wall.

7. The apparatus of claim 6 further characterized in that said tab means, walls and panels are all made from a single blank.

8. A shipping container feeder for containing animal feed comprising a top closure flap, a bottom closure flap, a front wall, a rear wall and side walls joined together to form a generally rectangular bin, said rear and front walls having lower edges, a first vertical reinforcing panel abutting against the rear wall and having an upper edge and a lower edge integrally joined to the rear wall lower edge at a first fold line and an inclined panel having a lower edge adjacent the front wall and an upper edge integrally joined to the rear reinforcing panel upper edge at a second fold line, said front wall having line means thereon delineating a tray portion separable therefrom to form a feed opening and foldable into a tray to receive feed through the feed opening, said inclined wall portion being inclined downwardly toward said tray portion, said line means including a third fold line on the front wall parallel to the second fold line, spaced parallel fourth and fifth fold lines extending perpendicular to the third fold line to in part define a tray bottom wall, and separation line means on opposite sides of the fourth and fifth fold lines to in conjunction with the fourth and fifth fold lines define tray side walls.

9. The apparatus of claim 8 wherein there is provided a front vertical reinforcing panel in the bin interior abutting against the front wall, the front panel having a lower edge integrally joined to the inclined panel lower edge at a fold line and line means delineating a separable throw away portion for providing a front panel opening adjacent the tray portion.

10. The apparatus of claim 8 wherein said front wall is integrally joined to the bottom closure flap at the third fold line, said tray portion bottom wall having one edge integrally joined to said bottom closure flap at the last mentioned fold line.

11. The apparatus of claim 10 wherein the first mentioned line means includes a sixth fold line on the front wall parallel to the third fold line, a first separation line parallel to the third fold line and on the opposite side of the sixth fold line from the third fold line, parallel seventh and eighth fold lines extending between the first separation line and the sixth fold line to in conjunction therewith delineate a tray front wall, lines delineating push out portions on the tray side walls for providing slots to receive tabs, and separation lines that in conjunction with the seventh and eighth fold lines delineate first and second tabs for being extended through the tray side wall slots.

12. A shipping container feeder for containing animal feed comprising a top closure flap, a bottom closure flap, a front wall, a rear wall and side walls joined together to form a generally rectangular bin, said front wall and rear wall each having upper, lower and first and second side edges, said front wall having a main body portion and line means thereon delineating a tray portion separable from the main body portion to form a feed opening and foldable into a tray to receive feed through the feed opening, said line means including fold lines delineating a tray bottom and separation lines that in conjunction with the fold lines delineate tray front and side walls.

13. The apparatus of claim 12 further characterized in that the separation lines includes a first and a second separation lines that are spaced, parallel to one another and the front wall side edges, and substantially more closely adjacent one another than the front wall side edges.

14. The apparatus of claim 13 further characterized in that each of the delineated tray walls is of a rectangular shape.

15. The apparatus of claim 12 further characterized in that one of the fold lines is coextensive with the juncture of the bottom flap and the front wall.

16. The apparatus of claim 15 wherein there is provided a front reinforcing panel in the bin interior in abutting relationship to the front wall, said reinforcing panel having line means thereon that delineate a tear out portion of a smaller area than the feed opening.

17. A container feeder for shipping and feeding animal food of a single piece construction and that includes a top closure flap, a bottom closure flap, a front wall, a rear wall, a first side wall and a second side wall joined together to form a rectangular box shaped bin and having interior surfaces, the front and rear walls having lower edges, a rear vertical reinforcing panel in abutting relationship to the rear wall interior surface and having an upper edge and a lower edge joined to the rear wall lower edge at a fold line, the height of the rear reinforcing panel being much less than the height of the rear wall, an inclined panel extending between the side walls and having an upper edge joined to the rear panel upper edge, a lower edge adjacent the front wall lower edge and side edges adjacent the side walls and a vertical front reinforcing panel in the bin interior in abutting relationship to the front wall and having a top edge at an elevation intermediate that of the front wall top edge and the rear panel upper edge, and a lower edge joined to the inclined panel lower edge at a fold line, said front panel and front wall each having line means delineating a feed opening, the front wall line means including line means delineating wall portions foldable into a tray for receiving feed from the bin.

18. The apparatus of claim 17 further characterized in that it includes side reinforcing panels in abutting relationship to the side walls and having upper edges joined to the inclined panel side edges at fold lines.

* * * * *